July 9, 1929.  E. T. FERNGREN  1,720,547
METHOD AND APPARATUS FOR DRAWING SHEET GLASS
Filed May 15, 1924
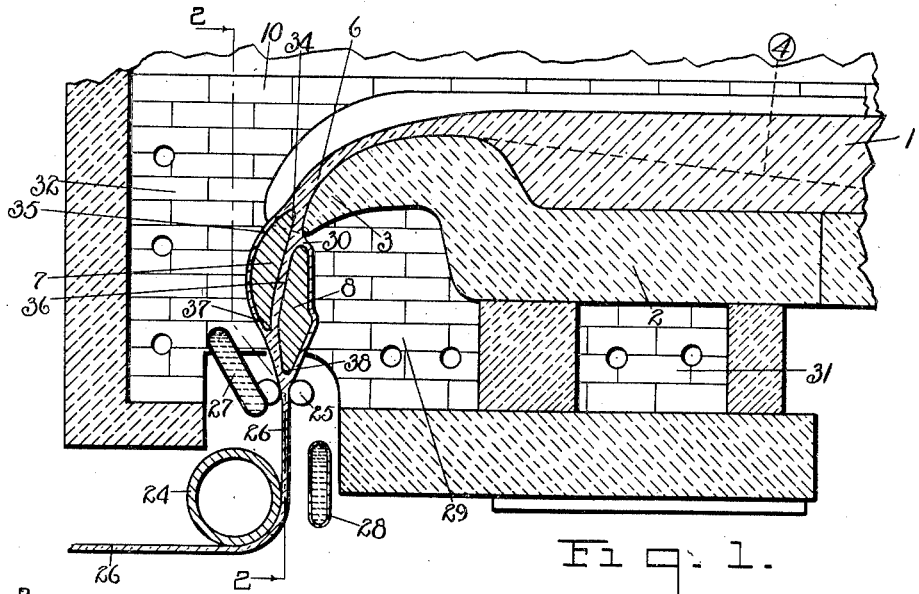
INVENTOR.
Enoch T. Ferngren.
C. H. Rowley
ATTORNEY.

Patented July 9, 1929.

1,720,547

UNITED STATES PATENT OFFICE.

ENOCH T. FERNGREN, OF TOLEDO, OHIO, ASSIGNOR TO THE LIBBEY-OWENS SHEET GLASS COMPANY, OF TOLEDO, OHIO, A CORPORATION OF OHIO.

METHOD AND APPARATUS FOR DRAWING SHEET GLASS.

Application filed May 15, 1924. Serial No. 713,446.

This invention relates to the art of making sheet glass, and more particularly to an improved method and apparatus for flowing and drawing molten glass downwardly and then horizontally into flat sheet form.

According to this invention, molten glass flows from a pool in a uniform shallow stream over a lip at one side of the container onto and around a pair of metallic directing or controlling members, from the lower edge of which the glass is drawn downwardly in sheet form and then deflected into a horizontal plane. Means are provided for controlling the temperature of the several streams of glass flowing onto, around and between the pair of directing members, in such a manner that the outer stream which has its source in the upper portion of the flow over the lip is rendered cooler and more tenacious so that it bears the greater portion of the drawing stresses, whereas the innermost stream, formed from the glass flowing in contact with the lip, is in a much hotter and more fluid condition, and is under no appreciable drawing strain.

The objects and advantages of this invention will be better understood from the following detailed description of one approved form of the apparatus.
In the accompanying drawings:

Fig. 1 is a longitudinal vertical section through the mechanism.

Fig. 2 is a transverse vertical section taken substantially on the line 2—2 of Fig. 1.
Fig. 3 is a partial plan view of that portion of the supply tank including the overflow lip, and adjacent supporting members.

Fig. 4 is an elevation of a portion of one of the adjusting mechanisms for one of the flow-controlling slabs.

The shallow pool of molten glass 1 is in communication with, and is a continuation of, a mass of molten glass produced in an adjacent tank furnace. This molten glass flows through the shallow container 2 and spills in a thin even stream over the overflow lip 3 at one end of the container. As best shown in Fig. 3, the central portion of the floor of container 2 comprises a wedge-shaped flow-equalizing member 4 having its small end 5 projecting in an up-stream direction into the center of the stream of flowing glass in container 2. This member 4 acts to retard the central portion of the glass stream, which is normally hotter and flows more freely, and to increase the fluency of the glass and its stream velocity toward the sides of the stream, in such a manner as to provide a uniformly flowing stream of glass 6 across the entire width of the overflow lip 3.

Directly below the discharge end of lip 3 is positioned a pair of directing members or slabs 7 and 8, of substantially the cross-sectional form shown in Fig. 1. These members are preferably metallic, being formed of some suitable heat-resisting alloy, and have a length substantially equal to the width of the stream 6 flowing from the overflow lip. Each of the directing members has supporting stems 9 projecting through the side walls 10 of the enclosing structure, and means are provided for adjusting each slab in practically any desired direction.

As shown in Figs. 3 and 4, each supporting stem 9 for the upper slab 7 is journaled for rotary movement in a bearing block 11. An adjusting crank 12 on the end of stem 9 is provided adjacent its outer end with a locking pin adapted to fit in any of a series of holes 13 in a bracket 14 projecting upwardly from bearing block 11. By swinging the crank 12 to the desired position the angular position of slab 7 with relation to a vertical plane may be varied as desired. Bearing block 11 is slidable horizontally in a slot or opening 15 in the lower end of a supporting bar 16. The bearing block 11 is held in the desired position within slot 15 by means of the set-screws 17 bearing against its opposite sides. By properly adjusting the screws 17 the slab 7 may be adjusted horizontally toward or from the lip 3. Supporting bar 16 is slidable vertically between a pair of guides 18 and is hung at its upper end from an adjusting screw 19. By properly manipulating the nut 20 at the upper end of screw 19, the slab 7 may be adjusted up or down with relation to the overflow lip 3.

An exactly similar set of adjusting mechanisms are provided for the inner slab 8, except that as here shown, the supporting bars 21 for the ends of the slab are not hung from above, as are bars 16, but are supported from below on suitable screws 22 provided with adjusting nuts 23. By means of the adjusting mechanisms briefly described above, the two slabs 7 and 8 may be adjusted toward or from one another, or either or both may be adjusted with relation to the overflow lip 3.

As will be described more in detail hereinafter, the stream of glass 6 spilling over lip 3 flows down between and around the two directing members 7 and 8, the molten glass being drawn downwardly in sheet form from the lowermost edge of these members and then deflected while still plastic into the horizontal plane about a cooled bending roller 24. A pair of, preferably driven, edge-gripping rollers 25 may engage the edge portions of the glass sheet 26 at its source to assist in the drawing process and hold the sheet to width.

A cooling member 27, here shown as a flat hollow metallic container through which a constant stream of cooling fluid such as water is maintained, is positioned adjacent the outermost stream of glass flowing over the two slabs, as shown in Fig. 1. A second cooler 28 is preferably positioned at a lower point adjacent the opposite side of the formed sheet 26.

A heating chamber 29 beneath the overflow lip 3 serves to maintain the stream of glass 30 which flows in direct contact with lip 3 and thence down the innermost side of slab 8 in a highly fluid condition, so as to avoid the formation of cold glass on the edge of lip 3 and hence lines in the sheet 26. The usual heating chambers 31 beneath the container 2, and 32 above the flowing glass, keep the tank and enclosing structures and the molten glass at the proper working temperature. Preferably, as shown in Fig. 3, the container 2 is somewhat narrower than the enclosing structure formed by side walls 10, so that passages 33 are provided around the edges of the container to allow heating gases to pass up from heating chambers 29 and 31 into the upper chamber 32, thus preventing the edge portions of the flowing glass from becoming unduly cooled.

In operation, as the molten stream 6 leaves the overflow lip 3, it is divided by the upper edge 34 of slab 7, into an outer stream 35 flowing down the outer side of slab 7, and an intermediate stream 36 passing down between the two slabs 7 and 8. A third stream 30, as previously described, flows directly off from the edge lip 3 and down the innermost face of slab 8. As the two outer streams of glass 35 and 36 flow downwardly they are acted upon by the heat-absorbing cooler 27, which is positioned so that the cooling effect begins, and is at its minimum, about the time the outermost stream 35 leaves the lower edge 37 of slab 7 and unites with the intermediate stream 36. This cooling effect reaches its maximum at the lower edge 38 of slab 8 where the two outer streams unite with the inner stream of liquid glass 30 and are then drawn downwardly to form sheet 26. The effect of this heat removal is to progressively give the surface of the outer layer of the glass a more stable plastic structure while it is under drawing stress, and to cause the formation of a plastic film on this layer through which drawing force may operate and be communicated to the more fluent glass, and thus form the main structural body portion of the sheet, and which plastic film, as it grows on the surface of the outer stream 35, is supplied from the outer and inner intermediate streams 35 and 36.

The intermediate stream 36 moving over the forward surface of the member 8 and clinging thereto provides considerable anchorage to the therewith merging glass of stream 35, the glass of which stream also receives considerable clinging support from the surface of the member 7 as the acceleration of glass movement occurs during drawing.

The glass of the intermediate stream 36 also acts as a sort of vehicular carrying medium, and while being a strong retractive factor because of its limited quantity relative to the extent of clinging surface associated therewith, yet supplies a high temperatured fluent glass which counterbalances the cooling action of the cooler 27, and limits its cooling effect principally to the glass of stream 35.

As noted above, the innermost stream 30 is maintained in a highly heated and almost fluid condition so as to avoid the formation of any lines or markings in this inner stream which ultimately forms the lower surface of the glass sheet. This inner stream 30 bears practically no portion of the drawing strain until the sheet has been formed below the two directing slabs 7 and 8. At this time the inner surface of the sheet is chilled by cooler 28 to approximately the temperature of the opposite face of the sheet.

The vertical sheet area 26 thus formed is now bent into a horizontal plane around the internally cooled roller 24. This roll functions partly as a bending roll, and partly as a cooling and resistance element, the cooling being effected by the contact of the glass sheet with the roll, since the roll is air-cooled on the inside, and resistance action being present by reason of the fact that the roll furnishes a moving or unyielding curve against which the sheet of glass is held by the drawing force, and to which it is caused to adhere while being stretched and moved onward. The sheet forming and attenuating process is thus accomplished both before the sheet area reaches the bending roll, by which time the sheet has been given considerable plastic stability, and also to a less degree after the now relatively firm glass sheet has passed beyond the bending roller.

Claims:

1. The method of forming sheet glass, consisting in flowing three streams of glass downwardly, chilling one of the outer streams, heating the other outer stream, and merging the three streams to form the source from which the sheet is drawn downwardly.

2. The method of forming sheet glass, consisting in flowing three streams of glass downwardly, chilling one of the outer streams, merging this stream with the intermediate stream, heating the other outer stream, merging this stream with the stream formed by the union of the other two streams, and drawing a glass sheet downwardly from the mass of glass formed by the union of the several streams.

3. In the art of drawing sheet glass, the method which consists in dividing a downwardly curving flow of molten glass into three vertically advancing streams, in causing the streams to merge at different points along a predetermined zone, and in communicating drawing stress to two of the streams to begin the sheet producing action before joining with the glass of the third stream.

4. In the art of drawing sheet glass, the method which consists in dividing a shallow overflowing body of molten glass into three descending streams, in causing two of the streams to coalesce while moving along a predetermined extent of rigid surface, in communicating drawing stress to the coalescing glass along said surface, and continuously forming a sheet of glass while adding the glass of the third stream to the said stream glass as it leaves said surface.

5. In the art of making sheet glass, the method which consists in forming three separately advancing veins and causing the drawn formation from said veins of a sheet of glass while progressively imparting greater cohesiveness to the glass comprising one of the veins as said vein comes under drawing stress.

6. In the art of making sheet glass, the method which consists in forming three separately advancing veins and causing the drawn formation from said veins of a sheet of glass while progressively imparting greater cohesiveness to the glass comprising one of the veins as said vein comes under drawing stress, and progressively causing the confluent advance of the other veins of glass as a feeding supply for the more cohesive glass during its tractive advance to form the sheet area.

7. In the making of sheet glass, the method which consists in producing a freely exposed, and mobile plastic body around rigid cores extending therethrough, in tapering the lower end of said body by the application of drawing force thereto, in making the layer of glass composing one face of the tapering extent of said body more responsive in the line of draw by cooling the same, and forming an advancing sheet of glass from the taper of said body.

8. The method of forming a sheet of glass which consists in first forming an internally supported horizontally extended and vertically suspended body of plastic glass, from which the sheet may be drawn, in giving support to said body, in applying drawing force to said source while progressively cooling one surface area as it attenuates and assumes approximate sheet formation, and in heating the entire opposite surface extent of the suspended body.

9. In apparatus for producing sheet glass, a container from which a stream of molten glass flows, and a pair of universally mounted directing members between and around which the molten stream passes.

10. In apparatus for producing sheet glass, a container from which a stream of molten glass flows, a pair of universally mounted directing members between and around which the molten stream passes, and means for drawing this glass downwardly from the members in sheet form.

11. In apparatus for producing sheet glass, a container from which a stream of molten glass flows, and a pair of horizontally extending directing members between and around which the molten glass passes, the members being mounted in overlapping parallel relation, with the upper edge of one member somewhat higher than the upper edge of the other member.

12. In apparatus for producing sheet glass, a container from which a stream of molten glass flows, and a pair of horizontally extending directing members between and around which the molten glass passes, the members being mounted in overlapping parallel relation, with the lower edge of one member lower than the lower edge of the other member.

13. In apparatus for producing sheet glass, a container from which a stream of molten glass flows, and a pair of horizontally extending directing members between and around which the molten glass passes, the members being mounted in overlapping parallel relation, with the upper edge of one member somewhat higher than the upper edge of the other member, and the lower edge of the second member lower than the lower edge of the first member.

14. In apparatus for producing sheet glass, a container from which a stream of molten glass flows, and a pair of horizontally extending directing members between and around which the molten glass passes, the members being mounted in overlapping parallel relation, with the upper edge of one member somewhat higher than the upper edge of the other member, and the lower edge of the second member lower than the lower edge of the first member, and a cooler mounted adjacent the point where the glass flowing down the outer side of the first member merges with the glass flowing between the members.

15. In apparatus for producing sheet glass, a container from which a stream of molten glass flows, a pair of horizontally extending directing members between and around which the molten glass passes, the members being mounted in overlapping parallel relation, and supporting means for each member whereby it may be adjusted sidewise, up and down or rotated about a horizontal axis.

16. The method of producing sheet glass, consisting in causing three downwardly flowing streams of glass to merge to form the sheet source, two of the streams first merging and subsequently joining with the third stream, the outer surface of the outer streams being free from contact with other surfaces until the sheet has become substantially set.

Signed at Toledo, in the county of Lucas and State of Ohio, this 12th day of May, 1924.

ENOCH T. FERNGREN.